(12) United States Patent
Inagaki

(10) Patent No.: US 7,260,612 B2
(45) Date of Patent: Aug. 21, 2007

(54) SWITCHING SYSTEM DUPLICATING FILE OPERATION COMMAND ACCORDING TO QUANTITY OF FILE SERVERS AND SENDING WRITING AND READING COMMANDS ACCORDING TO A SWITCHING ORDER

(75) Inventor: Takeshi Inagaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 10/447,734

(22) Filed: May 29, 2003

(65) Prior Publication Data

US 2004/0006626 A1 Jan. 8, 2004

(30) Foreign Application Priority Data

May 29, 2002 (JP) .............................. 2002-155136

(51) Int. Cl.
*G06F 15/167* (2006.01)
(52) U.S. Cl. ........................................ 709/213; 709/214
(58) Field of Classification Search ................ 709/213, 709/214, 203; 707/102; 711/162; 714/11; 710/5
See application file for complete search history.

(56) References Cited

U.S. PATENT DOCUMENTS

| | | | |
|---|---|---|---|
| 5,809,543 A * | 9/1998 | Byers et al. ................. 711/162 |
| 6,393,538 B2 * | 5/2002 | Murayama .................. 711/162 |
| 6,625,750 B1 * | 9/2003 | Duso et al. .................... 714/11 |
| 6,728,791 B1 * | 4/2004 | Young ............................ 710/5 |
| 2003/0028587 A1 * | 2/2003 | Driscoll et al. ............. 709/203 |
| 2005/0044104 A1 * | 2/2005 | Kaneda et al. .............. 707/102 |
| 2005/0044163 A1 * | 2/2005 | Kitamura et al. ........... 709/213 |

FOREIGN PATENT DOCUMENTS

| JP | 2002-7185 | 6/2000 |
|---|---|---|
| JP | 2001-34559 | 2/2001 |

OTHER PUBLICATIONS

T. Yugawa, et al. 'Video Network Server "Video Shower", National Technical Report vol. 42, No. 5, pp. 44-52, Oct. 18, 1996.

* cited by examiner

*Primary Examiner*—Le Hien Luu
(74) *Attorney, Agent, or Firm*—Kunzler & McKenzie

(57) ABSTRACT

A connection switching apparatus and system are disclosed that provide an inexpensive, high-speed and large-capacity file system having functional extensibility and enabling redundant data writing. A connection switching apparatus is provided on the side of a telecommunication circuit of a plurality of file servers. Provided within the connection switching apparatus are a communication control unit, a signal processing unit for appending a code indicating the leading end to the file identifier of a communication packet to be the leading end, a switching unit for performing connection switching to select a communication packet, a file server switching order storage unit, and a table storage unit storing in a table format a file identifier set for each file stored in the file servers are provided. When reading out a file from the file servers, the connection switching apparatus first forms a table in the table storage unit and then sends a file read out from the file servers in the order set in the table.

30 Claims, 14 Drawing Sheets

| TABLE - T1 ||||
|---|---|---|---|
| TARGET FILE SERVER | FILE NAME | ADDRESS OF FILE SERVER | FILE IDENTIFIER ON FILE SERVER |
| 1 FIRST FILE SERVER 3a (PATH : ABC) | ABC/XXX1.$ | ADDRESS OF FIRST FILE SERVER 3a | ABC/XXX1.$ |
| 2 SECOND FILE SERVER 3b (PATH : ABC) | ABC/XXX1 | ADDRESS OF SECOND FILE SERVER 3b | ABC/XXX1 |
| ⋮ | ⋮ | ⋮ | ⋮ |

READING ORDER (FILE NAME : XXX1, SPLIT DATA UNIT : 4k)
(1) TO (8) REPRESENT, FOR EXAMPLE, READING ORDER BY 4 KILOBYTES AS SPLIT UNIT

| FIRST FILE SERVER 3a | (1)ABC/XXX1.$:1-4k | (3)ABC/XXX1.$:(4k+1)-8k | (5)ABC/XXX1.$:(8k+1)-12k | (7)ABC/XXX1.$:(12k+1)-16k |
|---|---|---|---|---|
| SECOND FILE SERVER 3b | (2)ABC/XXX1:1-4k | (4)ABC/XXX1:(4k+1)-8k | (6)ABC/XXX1:(8k+1)-12k | (8)ABC/XXX1:(12k+1)-16k |

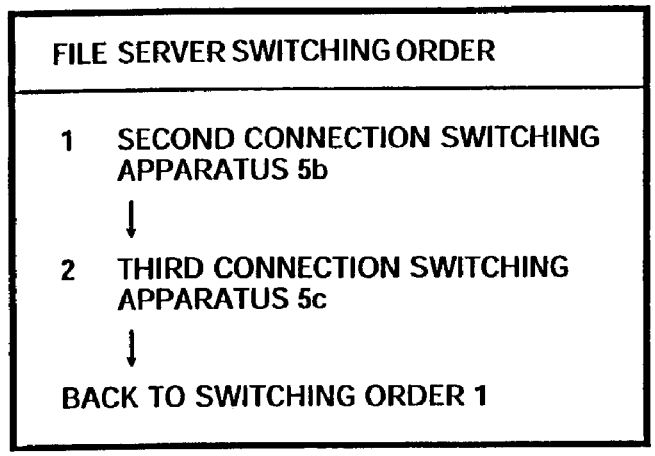
(a)
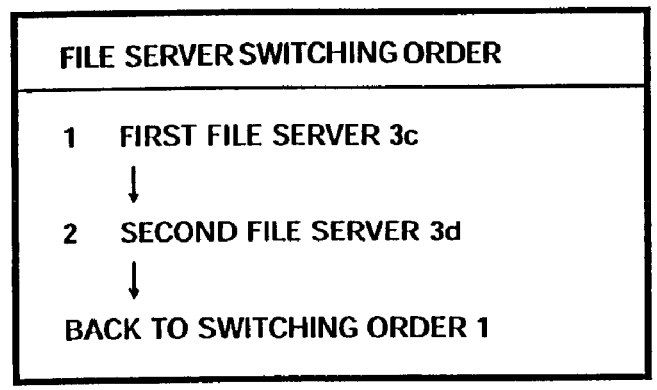
(b)
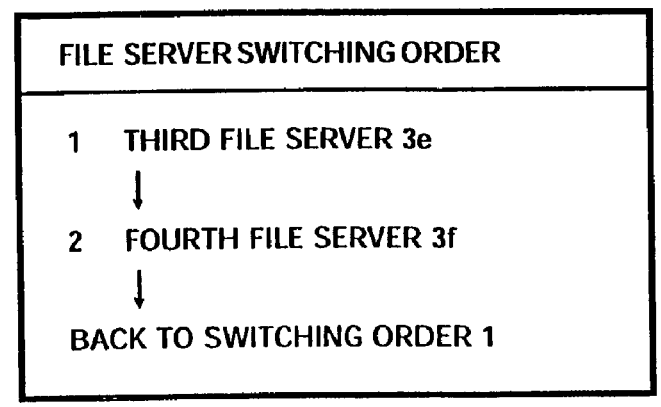
(c)
FIG. 6

| ROUTES TO RESPECTIVE FILE SERVERS | | | |
|---|---|---|---|
| FIRST FILE SERVER 3c | FIRST SWITCHING APPARATUS 5a → | SECOND SWITCHING APPARATUS 5b → | FIRST FILE SERVER 3c |
| SECOND FILE SERVER 3d | FIRST SWITCHING APPARATUS 5a → | SECOND SWITCHING APPARATUS 5b → | SECOND FILE SERVER 3d |
| THIRD FILE SERVER 3e | FIRST SWITCHING APPARATUS 5a → | THIRD SWITCHING APPARATUS 5c → | THIRD FILE SERVER 3e |
| FOURTH FILE SERVER 3f | FIRST SWITCHING APPARATUS 5a → | THIRD SWITCHING APPARATUS 5c → | FOURTH FILE SERVER 3f |

| TABLE : T2-1 |||||
|---|---|---|---|---|
| | TARGET FILE SERVER | FILE NAME | ADDRESS OF FILE SERVER | FILE IDENTIFIER ON FILE SERVER |
| 1 | SECOND CONNECTION SWITCHING APPARATUS 5b PATH : ABC | ABC/XXX1.$ | ADDRESS OF SECOND CONNECTION SWITCHING APPARATUS 5b | ABC/XXX1.$ |
| 2 | THIRD CONNECTION SWITCHING APPARATUS 5c PATH : ABC | ABC/XXX1 | ADDRESS OF THIRD CONNECTION SWITCHING APPARATUS 5c | ABC/XXX1 |

(b) 38a-2

| TABLE : T2-2 |||||
|---|---|---|---|---|
| | TARGET FILE SERVER | FILE NAME | ADDRESS OF FILE SERVER | FILE IDENTIFIER ON FILE SERVER |
| 1 | FIRST FILE SERVER 3c PATH : ABC | ABC/XXX1.$.$ | ADDRESS OF FIRST FILE SERVER 3c | ABC/XXX1.$.$ |
| 2 | SECOND FILE SERVER 3d PATH : ABC | ABC/XXX1.$ | ADDRESS OF SECOND FILE SERVER 3d | ABC/XXX1.$ |

(c) 38a-3

| TABLE : T2-3 |||||
|---|---|---|---|---|
| | TARGET FILE SERVER | FILE NAME | ADDRESS OF FILE SERVER | FILE IDENTIFIER ON FILE SERVER |
| 1 | THIRD FILE SERVER 3e PATH : ABC | ABC/XXX1.$ | ADDRESS OF THIRD FILE SERVER 3e | ABC/XXX1.$ |
| 2 | FOURTH FILE SERVER 3f PATH : ABC | ABC/XXX1 | ADDRESS OF FOURTH FILE SERVER 3f | ABC/XXX1 |

FIG. 8

READING ORDER (FILE NAME : XXX1, SPLIT DATA UNIT : 4k)
(1) TO (16) REPRESENT, FOR EXAMPLE, READING ORDER BY 4 KILOBYTES AS SPLIT UNIT

| | | | | |
|---|---|---|---|---|
| FIRST FILE SERVER 3c | (1)ABC/XXX1.$.$:1-4k | (5)ABC/XXX1.$.$:(4k+1)-8k | (9)ABC/XXX1.$.$:(8k+1)-12k | (13)ABC/XXX1.$.$:(12k+1)-16k |
| THIRD FILE SERVER 3d | (2)ABC/XXX1.$:1-4k | (6)ABC/XXX1.$:(4k+1)-8k | (10)ABC/XXX1.$:(8k+1)-12k | (14)ABC/XXX1.$:(12k+1)-16k |
| SECOND FILE SERVER 3e | (3)ABC/XXX1.$:1-4k | (7)ABC/XXX1.$:(4k+1)-8k | (11)ABC/XXX1.$:(8k+1)-12k | (15)ABC/XXX1.$:(12k+1)-16k |
| FOURTH FILE SERVER 3f | (4)ABC/XXX1:1-4k | (8)ABC/XXX1:(4k+1)-8k | (12)ABC/XXX1:(8k+1)-12k | (16)ABC/XXX1:(12k+1)-16k |

FIG. 9

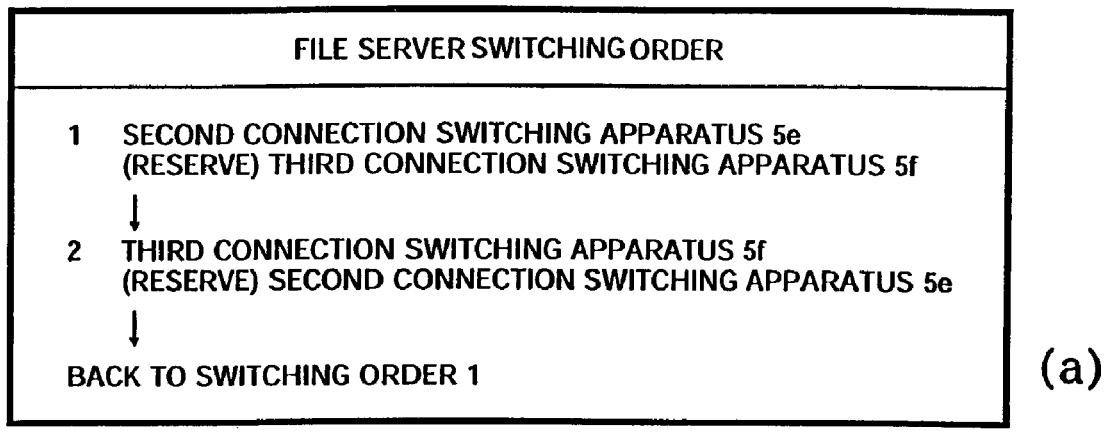
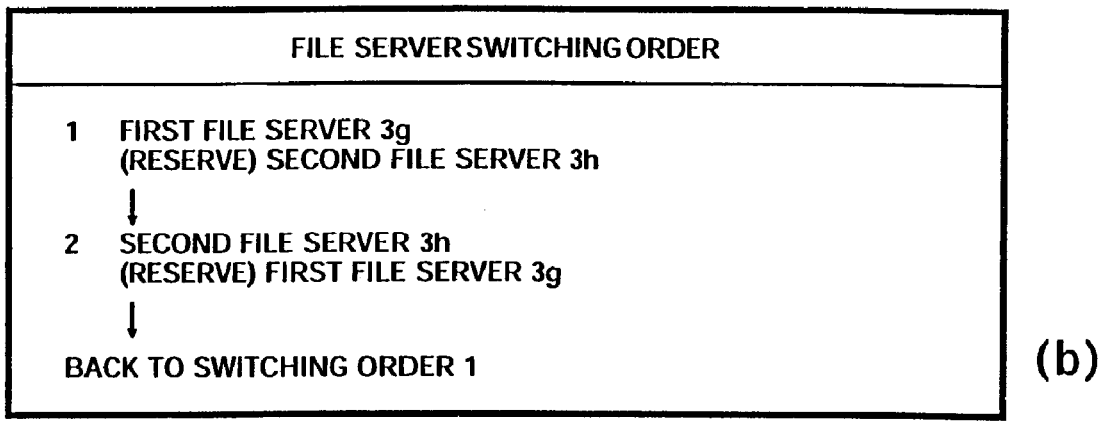
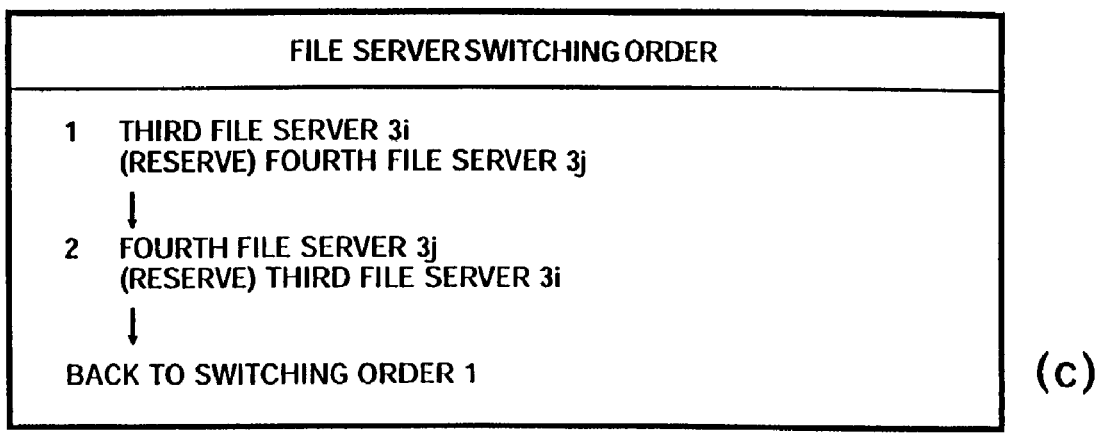
FIG. 12

(a) 38c-1

| TABLE : T3-1 ||||
|---|---|---|---|
| | TARGET FILE SERVER | FILE NAME | ADDRESS OF FILE SERVER | FILE IDENTIFIER ON FILE SERVER |
| 1 | SECOND CONNECTION SWITCHING APPARATUS 5b PATH : ABC | ABC/XXX1 . $ (ABC/XXX1 . $) | ADDRESS OF SECOND CONNECTION SWITCHING APPARATUS 5b (ADDRESS OF THIRD CONNECTION SWITCHING APPARATUS 5c) | ABC/XXX1 . $ (ABC/XXX1 . $) |
| 2 | THIRD CONNECTION SWITCHING APPARATUS 5c PATH : ABC | ABC/XXX1 (ABC/XXX1) | ADDRESS OF THIRD CONNECTION SWITCHING APPARATUS 5c (ADDRESS OF SECOND CONNECTION SWITCHING APPARATUS 5b) | ABC/XXX1 (ABC/XXX1) |

(b) 38c-2

| TABLE : T3-2 ||||
|---|---|---|---|
| | TARGET FILE SERVER | FILE NAME | ADDRESS OF FILE SERVER | FILE IDENTIFIER ON FILE SERVER |
| 1 | FIRST FILE SERVER 3g PATH : ABC | ABC/XXX1 . $ (ABC/XXX1.$.$) | ADDRESS OF FIRST FILE SERVER 3g (ADDRESS OF SECOND FILE SERVER 3h) | ABC/XXX1.$.$ (ABC/XXX1.$.$) |
| 2 | SECOND FILE SERVER 3h PATH : ABC | ABC/XXX1 . $ (ABC/XXX1 . $) | ADDRESS OF SECOND FILE SERVER 3h (ADDRESS OF FIRST FILE SERVER 3g) | ABC/XXX1 . $ (ABC/XXX1 . $) |

(c) 38c-3

| TABLE : T3-3 ||||
|---|---|---|---|
| | TARGET FILE SERVER | FILE NAME | ADDRESS OF FILE SERVER | FILE IDENTIFIER ON FILE SERVER |
| 1 | THIRD FILE SERVER 3i PATH : ABC | ABC/XXX1 . $ (ABC/XXX1 . $) | ADDRESS OF THIRD FILE SERVER 3i (ADDRESS OF FOURTH FILE SERVER 3j) | ABC/XXX1 . $ (ABC/XXX1 . $) |
| 2 | FOURTH FILE SERVER 3j PATH : ABC | ABC/XXX1 (ABC/XXX1) | ADDRESS OF FOURTH FILE SERVER 3j (ADDRESS OF THIRD FILE SERVER 3i) | ABC/XXX1 (ABC/XXX1) |

FIG. 14

SWITCHING SYSTEM DUPLICATING FILE OPERATION COMMAND ACCORDING TO QUANTITY OF FILE SERVERS AND SENDING WRITING AND READING COMMANDS ACCORDING TO A SWITCHING ORDER

BACKGROUND OF THE INVENTION

1. Field of the Invention

This invention relates to an apparatus for controlling a file server having a plurality of disk storage units, and particularly to an apparatus for writing a file in a distributed manner into a plurality of file servers and reading out a file written in a distributed manner in a plurality of file servers.

2. Description of the Related Art

A file server is a device for writing a file received from a client connected to a telecommunication circuit into a disk storage unit and reading out a file written in a disk storage unit in accordance with a request from a client.

FIG. 16 is a view showing a structure of a conventional file server. A file server 3 stores a file received from a client 1 (communication counterpart), which is an information processing device (terminal device) such as a personal computer, via a telecommunication circuit 2. The file server 3 also reads out and sends a file to the client 1 when a read-out request is received from the client 1 as the communication counterpart.

Generally, a file is transmitted and received by packet via the telecommunication circuit 2. The file server 3 has a communication control unit 11 for discriminating and storing received packets or sending a stored file as packets. The file server 3 also has a file management unit 12 for managing a file to be stored and a disk storage unit 13 for storing a file.

By communicating with the file server 3 of FIG. 16 via the telecommunication circuit 2, the user of the client 1 can write or read out a file to or from the file server 3.

Generally, inside a CPU or the like and in a control system of a file server using a disk device, processing is carried out at a much higher speed than the speed of writing or reading out file data to or from a disk drive. Moreover, the control device bears only a light load due to a file system and communication protocols. The control device also bears only a light load for controlling individual disk drives. In short, the bottleneck of the data reading/writing speed in a file system is the reading/writing speed of the head of the disk drive.

Although the file server is very convenient to the client as described above, increasing the number of clients connected to the file server also increases the number of files to be handled and hence the storage capacity of the built-in disk storage unit 13 may become insufficient. A typical method for increasing the storage capacity is to add an external additional disk storage device or to replace the built-in disk drive with a disk drive with a large storage capacity.

However, since the storage capacity per disk drive is limited and the number of disk drives that can be managed in an ordinary operating system of a file server is also limited, the possibility of increasing capacity in a general-purpose file server is limited. Therefore, when a file server with a very large capacity is necessary, expensive disk drives having particularly large capacities must be used as individual disk drives, or an expensive and special operating system capable of managing many disk drives must be used as the operating system of the file server.

FIG. 17 is a view showing a structure of a conventional file server having a RAID (Redundant Array of Inexpensive Disks) device. The RAID device is a storage device formed by combining a plurality of relatively inexpensive disk drives (disk storage units) in an array as one virtual logical disk drive. The RAID device is adapted for redundantly writing data of a file or the like. The RAID device is a highly reliable and highly capable disk storage device that can improve the reading/writing speed of the head of the disk drive, which is the bottleneck of the above-described general-purpose file device, by redundantly writing data to the plurality of disk drives, and can also recover data in a defective disk drive, if any, by using the other disk drives.

To redundantly write data may be, for example, to add meaningless excess data to fill a predetermined number of bits, or to write data at different locations instead of completely overwriting the previous data in the disk drives. To redundantly write data in the RAID device is generally to write the same data in at least two different disk drives or to add the difference between basic data and data of this time as parity data. Thus, the RAID device enables recovery of data in a defective disk drive, if any, by using the other disk drives.

The difference between FIG. 16 and FIG. 17 is the employment of a RAID 4 device to be managed by the file management unit 12. A RAID device 4 has disk storage units 22 and 23 for storing files therein, and has a disk management unit 21 for managing the plurality of disk storage units 22 and 23. The file management unit 12 and the RAID device 4 are connected with each other by an optical fiber circuit or the like capable of communicating a large volume of data at a high speed. The disk management unit 21 has a dedicated program. Although two disk storage units are shown in FIG. 17 for simplifying the explanation, many of the actual RAID devices have three or more disk storage units. Likewise, the RAID device 4 may employ multiple disk management units 21.

The disk management unit 21 can manage the disk storage units 22 and 23 as one disk storage unit. Therefore, since the disk storage unit 13 of the file server 3 need not have a large capacity and the file server 3 may be a general-purpose file server, a high-speed large-capacity file system can be constructed relatively inexpensively by connecting a RAID device 4 to the file server 3.

Since the RAID device 4 has a large storage capacity, loss of stored data in case of some trouble in one disk drive is overcome by redundantly (doubly) storing data in the plurality of disk drives 22 and 23 like a mirror ring, and the processing in the file server can be continued.

However, in the case where the RAID device 4 is connected to the general-purpose file server 3, though processing of a large volume of data at a high speed is made possible by using the plurality of disk drives 22 and 23 as described above, the flow of data concentrates, for example, between the file management unit 12 and the RAID device 4, and therefore a special circuit is necessary. Moreover, in order to connect to many general-purpose disk drives, a special circuit board having a dedicated program and special hardware such as a high-speed processor, a large-capacity memory device, and fiber channels for communications between the disk drives is necessary as the disk management unit 21. Therefore, there is a problem that the RAID device 4 is generally expensive even though relatively inexpensive disk drives can be used as the individual disk drives 22 and 23 in the RAID device 4.

Also in the case where the file server 3 and the RAID device 4 are assumed to constitute a file system, since the RAID device 4 is expensive even though a relative inexpensive file server can be used as the file server 3, there is a problem that the file system is expensive as a whole.

Since special hardware is used for the RAID device as described above, there is also a problem that extension of its functions is difficult.

To deal with the above-described problems, a technique of constituting a high-speed large-capacity file system by sharing disk drives between file servers, and a technique of connecting many disk drives to a file server without using a RAID device have been considered. In these cases, however, processing of software is complicated and the capability of the CPU becomes less sufficient. Moreover, program development is very time-consuming and expensive and sufficient versatility and extensibility cannot be realized.

In order to solve the conventional problems as described above, what is needed is an inexpensive, high-speed and large-capacity file system having extensible functions and enabling redundant writing of data.

BRIEF SUMMARY OF THE INVENTION

The present invention has been developed in response to the present state of the art, and in particular, in response to the problems and needs in the art that have not yet been fully solved by currently available file systems and methods. Accordingly, the present invention has been developed to provide a process, apparatus, and system for writing a file to and reading a file from a plurality of file servers using a connection switching apparatus that overcome many or all of the above-discussed shortcomings in the art.

The connection switching apparatus is provided with a logic unit containing a plurality of modules configured to functionally execute the necessary steps of writing to and reading a file from a plurality of file servers. These modules in the described embodiments include a communication control module, a signal processing/switching control module, a signal processing module, a switching module, a file server switching order storage module, a program storage module, and a table storage module. In further embodiments, the connection switching apparatus also includes a duplication writing module, a recovery module, a new file preparation module, a file write module, an existing file acquisition module, and a file read module.

According to one embodiment of the present invention, a connection switching apparatus comprises: communication control means connected to a telecommunication circuit and adapted for detecting each communication packet received from a communication counterpart via the telecommunication circuit and reading a file operation command from the communication packet; signal processing means for duplicating the file operation command in accordance with the number of file servers to be used and rewriting a part of the file operation command when necessary; switching means connected with each file server and adapted for carrying out switching for allocating and sending the file operation command to each file server and switching for selecting a communication packet to be sent from each file server to the communication counterpart; switching order setting means for setting the switching order of the plural file servers connected to the switching means; program storage means having at least a program for, when the file operation command is received, duplicating the file operation command at the signal processing means, then sending the file operation command to each file server in accordance with the switching order, and collectively sending response contents received from each file server to the communication counterpart; and signal processing/switching control means for carrying out transmission/reception of a file by communication packet on the basis of each program.

According to a further embodiment of the invention, in the connection switching apparatus, when two file servers are connected with the switching means, the switching order is alternating.

According to a further embodiment of the invention, in the connection switching apparatus, when three or more file servers are connected with the switching means, the switching order is circular.

According to a further embodiment of the invention, in the connection switching apparatus, the program storage means stores: a program for, when writing a file to a first file server, duplicating a communication packet received at the signal processing means and writing a duplicate file to at least one second file server in accordance with the writing order of the duplicate file preset in accordance with the switching order; and a program for reading out the duplicate file from the second file server when the file cannot be read out from the first file server.

According to a further embodiment of the invention, the connection switching apparatus comprises table storage means for storing a file identifier set for each file and a network address set for each file server in a table format in a preset order, wherein every time the file operation command is received, the program prepares a table corresponding to a file identifier indicated in the file operation command and stores the table into the table storage means through transmission to/reception from each file server carried out in the switching order or reads out a table corresponding to the file identifier indicated in the file operation command from the table storage means and carries out transmission to/reception from each file server in the order of the table.

According to a further embodiment of the invention, in the connection switching apparatus, when the file operation command is a command for preparing a new file, the program causes the table storage means to store a table prepared using the file identifier and the network address received from each file server, then sets a table number for the table, and sends back the table number as a file identifier to the communication counterpart.

According to a further embodiment of the invention, in the connection switching apparatus, when the file operation command is a write command, the program reads out a table from the table storage means on the basis of the table number received as a file identifier, sends a duplicated write command to each file server in accordance with the order of the table, and collectively sends back response contents sent back from each file server to the communication counterpart.

According to a further embodiment of the invention, in the connection switching apparatus, when the file operation command is a command for acquiring a file identifier of an existing file, the program detects the file identifier of the existing file and an existing file identifier to which a code indicating the leading end is added, together with each file identifier and network address, from each file server, then prepares a table using an existing file name, each file identifier and network address and stores the table to the table storage means, then sets a table number for the table, and sends back the table number as a file identifier.

According to a further embodiment of the invention, in the connection switching apparatus, when the file operation command is a read command, the program reads out a table from the table storage means on the basis of the table number received as a file identifier, sends a duplicated read command to each file server in accordance with the order of the table, and collectively sends back response contents sent back from each file server to the communication counterpart.

According to a further embodiment of the invention, in the connection switching apparatus, with respect to the file operation command duplicated for a file server to be the leading end in accordance with the switching order, the signal processing means adds a code indicating the leading end to a file name to be stored and then duplicates file operation command, and with respect to the file operation command duplicated for a file server that is not to be the leading end, the signal processing means duplicates the file operation command using a file name to be stored as it is.

According to a further embodiment of the invention, in the connection switching apparatus, when judging the file server to be the leading end, the signal processing means selects the file server using a random number from the switching order.

According to a further embodiment of the invention, in the connection switching apparatus, when writing a file to each file server, a file server to which the last communication packet is written is stored in the table storage means, and when writing a next file to the file servers, the signal processing means regards a file server next to the file server in which the last communication packet is written in the previous writing of the file, as a file server to be the leading end.

According to a further embodiment of the invention, in the connection switching apparatus, the program storage unit stores: a program for, when writing a file to a first file server, duplicating a communication packet received at the signal processing unit, then writing a duplicate file to at least one second file server in accordance with the writing order of the duplicate file preset in accordance with the switching order, and preparing a table storing the file identifier and network address of the second file server in association with the file identifier and network address of the first file server; and a program for reading out the duplicate file from the second file server with reference to the table when the file cannot be read out from the first file server.

A file system is also disclosed using a connection switching apparatus that has a hierarchical structure using three or more of the connection switching apparatus so that the apparatus on the telecommunication circuit side is used for a smaller number of times and the apparatus on the file server side is used for a greater number of times, wherein the connection switching apparatus on the higher hierarchical stage regards the connection switching apparatus on the lower hierarchical stage as the file server and prepares the table, and the connection switching apparatus on the lower hierarchical stage regards the connection switching apparatus on the higher hierarchical stage as the telecommunication circuit or a client and prepares the table.

According to a further embodiment of the file system, with respect to a file operation command having a code indicating the leading end added to a file name in the connection switching apparatus on the higher hierarchical stage, the connection switching apparatus on the lower hierarchical stage further adds a code indicating the leading end to the file name.

A process for writing a file to a file server and reading a file from a file server is also presented. Generally, the process includes processing a file operation command that is associated with the file, duplicating the file operation command according to the quantity of the plurality of file servers, sending, according to a switching order, the file operation command to one of the plurality of file servers, and storing a program for processing the file operation command.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 6(a) to 6(c) show examples of file serving switching orders stored in file server switching order storage units of the respective connection switching apparatus of FIG. 5;

FIG. 7 is a view showing one embodiment of routes to respective file servers of FIG. 5;

FIGS. 8(a) to 8(c) show separate embodiments of tables stored in table storage units of the connection switching apparatus of FIG. 5;

FIG. 9 is a view showing an example of a data reading order from respective file servers;

FIGS. 12(a) to 12(c) show examples of switching orders stored in file server switching order storage units of the respective connection switching apparatus of FIG. 11;

FIGS. 14(a) to 14(c) are views of tables stored in table storage units of FIG. 11;

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
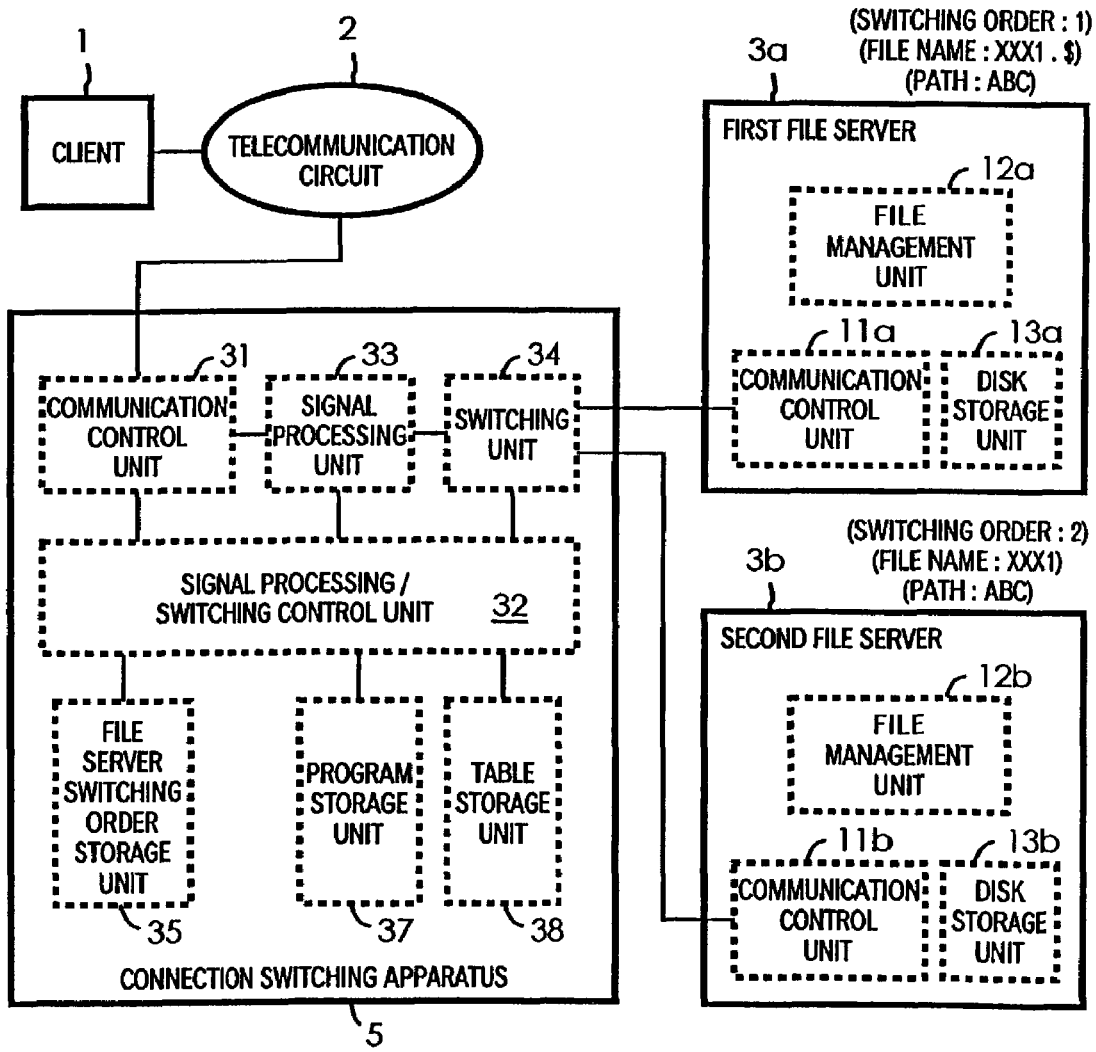
FIG. 1 is a view showing a file system of a first embodiment of the present invention.

FIG. 1 shows a file system of a first embodiment of the invention. In FIG. 1, parts having the same functions as those of the conventional file systems shown in FIGS. 16 and 17 (described in the Description of the Related Art) are denoted by the same numerals and will not be described in further detail.

Figure 16:
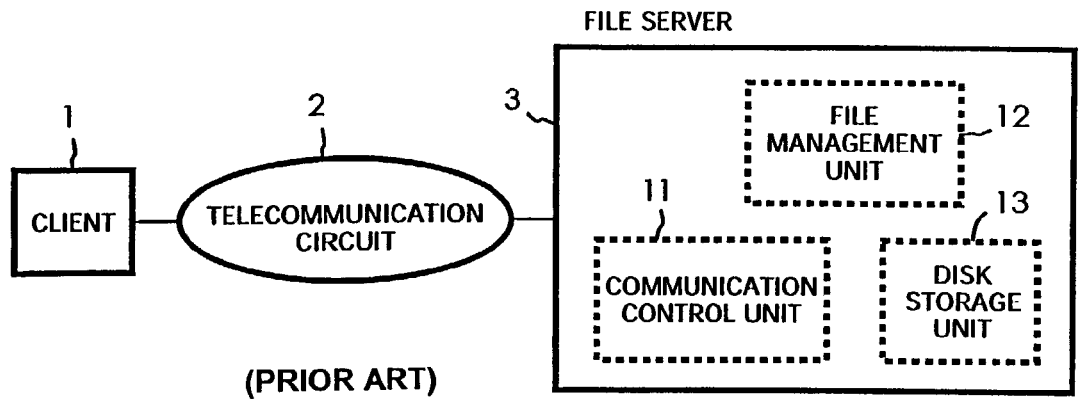
FIG. 16 is a view showing a structure of a conventional file server.
Figure 17:
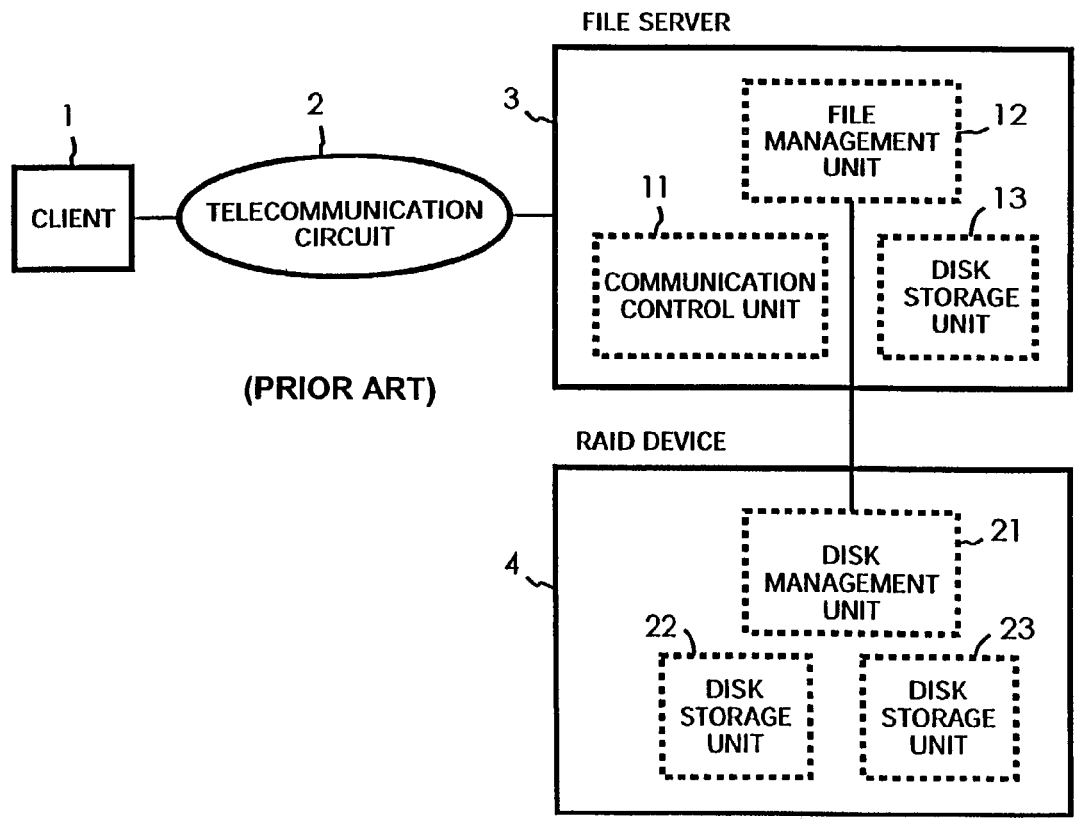
FIG. 17 is a view showing a structure of a conventional file server having a RAID device.

The file system of the embodiment shown in FIG. 1 differs from the conventional examples shown in FIGS. 16 and 17 in that a connection switching apparatus 5 is provided on the telecommunication circuit 2 side of a plurality of file servers 3a, 3b.

A first file server 3a and a second file server 3b of this embodiment shown in FIG. 1 may be, for example, general-purpose file servers such as commercially available personal computers that do not need special hardware, such as a dedicated board or fiber channel. Therefore, all of communication control units 11a, 11b, file management units 12a, 12b, and disk storage units 13a, 13b in the first file server 3a and second file server 3b may be general-purpose units.

The depicted connection switching apparatus 5 has a communication control module 31, a signal processing/switching control module 32, a signal processing module 33, a switching module 34, a file server switching order storage module 35, a program storage module 37, and a table storage module 38. The communication control module 31 is hereinafter referred to as a communication control unit 31. The signal processing/switching control module 32 is hereinafter referred to as a signal processing/switching control unit 32. The signal processing module 33 is hereinafter referred to as a signal processing unit 33. The switching module 34 is hereinafter referred to as a switching unit 34. The file server switching order storage module 35 is hereinafter referred to as a file server switching order storage unit 35. The program storage module 37 is hereinafter referred to as a program storage unit 37. The table storage module 38 is hereinafter referred to as a table storage unit 38.

The communication control unit 31 is connected with a telecommunication circuit 2. The communication control unit 31 detects each communication packet, such as a communication packet conformable to the Internet protocol, received from the telecommunication circuit 2 and detects its header information, thereby detecting a communication packet to be the leading end in an arbitrary file from the communication packets and carrying out general communication control of transmission/reception of the communication packets.

The signal processing/switching control unit 32 analyzes the detected header information for carrying out transmission/reception of the file by communication packet and carries out various signal processing in the connection switching apparatus 5, switches the switching unit 34, which will be described later, and controls the other units, on the basis of each program stored in the program storage unit 37, which will be described later.

The signal processing unit 33 duplicates a file operation command received from the telecommunication circuit 2 in accordance with the number of file servers 3a, 3b and rewrites a part of the file operation command, when necessary.

When the signal processing unit 33 rewrites a part of a file operation command, for example, with respect to a file operation command duplicated for a file server to be the leading end (for example, first file server 3a) in accordance with the switching order stored in the file server switching order storage unit 35, a code (for example, ".$") indicating the leading end is added to a file name to be stored and the file operation command is then duplicated. With respect to a file operation command duplicated for a file server that is not to be the leading end (for example, second file server 3b), the file operation command is duplicated using a file name to be stored as it is. Hereinafter, this duplication and rewriting will be collectively called adjustment.

In the case of storing a file with a short data length to many file servers, if a server to be the leading end is fixed, the quantity of data written to the leading server may be increased. In that case, for example, when judging a file server to be the leading end in the signal processing unit 33 from the switching order stored in the file server switching order storage unit 35, the file server may be selected using a random number. Alternatively, for example, when writing a file to each file server, a file server in which a communication packet to be the last communication packet is written may be stored in the table storage unit 38, and when judging a file server to be the leading end in the signal processing unit 33 at the time of writing the next file to the file servers, a file server next to the file server in which the last communication packet is written in the previous file writing may be regarded as a leading file server.

The switching unit 34 is connected with the plurality of file servers 3a, 3b having the disk storage units 13a and 13b. The switching unit 34 carries out connection switching for allocating the file servers 3a, 3b as transmission destinations, for example, to decide whether each communication packet received from the telecommunication circuit 2 should be sent to the first file server 3a or the second file server 3b, and also carries out connection switching for selecting communication packets to be input from the plurality of file servers 3a, 3b and the like and sent to the telecommunication circuit 2.

The file server switching order storage unit 35 stores the switching order of the first file server 3a and the second file server 3b connected with the switching unit 34. For example, in the case where two file servers 3a, 3b are connected with the switching unit 34, the switching order stored in the file server switching order storage unit 35 is alternating. However, in the case where three or more file servers are connected with the switching unit 34, the switching order stored in the file server switching order storage unit 35 is circular.

The program storage unit 37 has at least a program for adjusting the file operation command at the signal processing unit 33, when a file operation command is received, then sending the file operation command to the file servers 3a, 3b, in accordance with the switching order, and collectively sending response contents received form the file servers 3a, 3b to the client 1 over the telecommunication circuit 2.

As a program in the case where the file operation command is a command for preparing a new file, for example, the following program may be used. First, a table prepared using file handles as file identifiers and network addresses received from the file servers 3a, 3b is stored in the table storage unit 38. Then a table number for that table is set. Moreover, the table number is sent back as a file identifier to the client 1 over the telecommunication circuit 2.

As a program in the case where the file operation command is a write command, for example, the following program may be used. First, a corresponding table is read out from the stable storage unit 38 on the basis of a table number received as a file identifier and the write command is adjusted in accordance with its contents. The write command then is sent to the file servers 3a, 3b. Moreover, response contents sent back from the file servers 3a, 3b are collectively sent back to the client 1 over the telecommunication circuit 2.

As a program in the case where the file operation command is a command for acquiring the file identifier of an existing file, for example, the following program may be used. First, using the file name of the existing file and an existing file name to which a code ".$" indicating the leading end is added, each file identifier (file handle) and network address are acquired from each file server 3a, 3b. Next, a table is prepared using the existing file name, each file identifier and network address, and the table is stored into the table storage unit 38. Moreover, a table number for that table is set and the table number is sent back as a file identifier to the client 1 over the telecommunication circuit 2.

As a program in the case where the file operation command is a read command, for example, the following program may be used. First, a corresponding table is read out from the table storage unit 38 on the basis of a table number received as a file identifier, and the read command adjusted in accordance with the contents of the table is sent to the file servers 3a, 3b. Moreover, response contents sent back from the file servers 3a, 3b are collectively sent back to the client 1 over the telecommunication circuit 2.

To improve reliability, in the case of redundantly writing data to each file server 3a, 3b, for example, a program for duplicating a received communication packet at the signal processing unit 33 when writing a file to the first file server 3a and writing the duplicate file to the second file server 3b in accordance with the writing order of the duplicate file preset in accordance with the switching order may be provided in the program storage unit 37. In that case, a program for reading a duplicate file from the second file server 3b when an arbitrary file cannot be read out from the first file server 3a is provided at the same time.

The table storage unit 38 stores a file identifier (file handle) set by the file servers 3a, 3b for each file and a network address set for each file server 3a, 3b in a table format in a preset order. Moreover, for example, a file server in which a communication packet to be the last communication packet when writing a file to the file servers 3a, 3b is written may be stored in the table storage unit 38, and when writing the next file to the file servers 3a, 3b, a file server next to the file server in which the last communication packet is written in the previous file writing may be regarded as a leading file server in the signal processing unit 33.

Figures 2, 3:
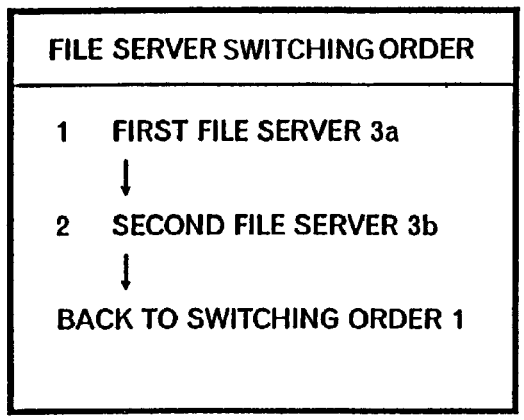
FIG. 2 is a view showing an example of a file server switching order stored in a file server switching order storage unit.
FIG. 3 is a view showing an example of a table stored in a table storage unit.

FIG. 2 shows an example of the switching order of the file servers 3a, 3b stored in the file server switching order storage unit 35. In this embodiment, as shown in FIG. 2, the processing order of switching the switching unit 34 from the first file server 3a to the second file server 3b and then returning to the first file server 3a again is stored in the file server switching order storage unit 35.

FIG. 3 shows an example of the table stored in the table storage unit 38. In this embodiment, a table T1 for writing or reading of a file name XXX1 is generated. In the example of the table T1, a path "ABC" is set and therefore a file "XXX1" is designated as "ABC/XXX1". For convenience, this representation of "ABC/XXX1" is also referred to as a file name. However, a file name with respect to the first file server 3a, which is the leading file server in the depicted embodiment, is "ABC/XXX1.$" with ".$" added at the end for indicating the leading end.

The operation of the file system of this embodiment is carried out as follows. When a file operation command from the client 1 is received at the communication control unit 31 via the telecommunication circuit 2, the signal processing/switching control unit 32 confirms the type of the file operation command from the header information of the file operation command (communication packet). That is, the signal processing/switching control unit 32 confirms whether the received file operation command is a command for preparing a new file, a write command, a command for acquiring the file identifier of an existing file, or a read command.

First, the case of allocating and writing data to the first file server 3a and the second file server 3b when the file operation command received by the connection switching apparatus 5 from the client 1 is a command for preparing a new file and a write command, which is subsequently received, will be described.

As the operation of the connection switching apparatus 5 in this case, for example, when the received file operation command is a command for preparing a new file, first, an adjusted new file preparation command is sent to the file servers 3a, 3b in accordance with the switching order stored in the file server switching order storage unit 35. The new file preparation command is for commanding the file servers 3a, 3b to prepare a file corresponding to the file name "ABC/XXX1" indicated in the command (communication packet) and send back its file identifier (file handle) and the network addresses of the file servers 3a, 3b. In this case, the connection switching apparatus 5 commands a file server, in this case the first file server 3a, to be the leading end to prepare a file with a code (".$") indicating the leading end added to the file name.

The first file server 3a prepares a file using the received file name "ABC/XXX1.$", then allocates a file handle proper to the file, and notifies the connection switching apparatus 5 of the network address of the file server 3a itself and the file handle. The other file server, in this case the second file server 3b, prepares a file using the received file name "ABC/XXX1" and similarly notifies the connection switching apparatus 5 of the network address and the file handle. Although the file handle is the same as the file name for convenience, the file handle used as a file identifier may be an arbitrary number if it can specify the file at each file server 3a, 3b.

After receiving the addresses and file identifiers (file handles) from the file servers 3a, 3b, the connection switching apparatus 5 prepares a table, similar to the table shown in FIG. 3, based on the addresses and file identifiers and stores the table into the table storage unit 38. Then, a table number Ti, in this case table number "T1," is allocated to the table and this table number is sent back to the client 1 as a file identifier.

As the file identifier (table number) is sent back, the client 1 commands the connection switching apparatus 5 to write the received file identifier together with necessary information for access such as a start offset address and length.

The operation in the case where a write command is received after a new file preparation command will be described hereinafter. Having received a write command from the client 1, the connection switching apparatus 5 confirms that the file operation command received from the client 1 is a write command. When the first write command is confirmed, the connection switching apparatus 5 reads out a corresponding table, for example table T1, from the table storage unit 38 on the basis of the file identifier, for example table number Ti, in the command.

Next, in the connection switching apparatus 5, the signal processing/switching control unit 32 adjusts the received write command in accordance with the contents of the table T1 and allocates and sends the write command to the file servers 3a, 3b. In this case, in accordance with the preset switching order (in this case, in the order of 3a, 3b), the first data stripe is transferred to the file server 3a and the second data stripe is transferred to the file server 3b. The third data stripe is transferred to the file server 3a as the switching order is alternating (and circular), and the fourth data stripe is transferred to the file server 3b. In this manner, each data stripe of a predetermined size, for example 4 kilobytes, is transferred circularly between the file servers 3a, 3b and written to the respective file servers 3a, 3b.

The case of allocating a command to the first file server 3a and the second file server 3b and reading out data when the file operation command received by the connection switching apparatus 5 from the client 1 is a command for acquiring the file identifier of an existing file and a read command, which is subsequently received, will now be described.

First, when the received file operation command is a command for acquiring the file identifier of an existing file, the connection switching apparatus 5 first sends an adjusted file identifier acquisition command to the file servers 3a, 3b in accordance with the switching order stored in the file server switching order storage unit 35.

The file identifier acquisition command is, for example, for commanding the file servers 3a, 3b to send back a file identifier corresponding to a file name indicated in the command and the network addresses of the file servers 3a, 3b. In this case, the connection switching apparatus 5 sends an ordinary file name "ABC/XXX1" and a file name "ABC/XXX1.$" with a code ".$" indicating the leading end to the respective file servers.

Of the file servers 3a, 3b having received the file identifier acquisition command containing the file names "ABC/XXX1" and "ABC/XXX1.$", a file server to be the leading end for this file, for example the first file server 3a, notifies the connection switching apparatus 5 of a file identifier allocated to the file indicated by the file name "ABC/XXX1.$" and the network address of the file server 3a itself. The other file server 3b notifies the connection switching apparatus 5 of a file identifier allocated to the file indicated by the file name "ABC/XXX1" and the network address of the second file server 3b.

After receiving the addresses and file identifiers from the file servers 3a, 3b, the connection switching apparatus 5 prepares a table as shown in FIG. 3 based on the addresses and file identifiers and stores the table into the table storage unit 38. Then, the connection switching apparatus 5 allocates a table number Ti to the table and sends back the table number as a file identifier to the client 1.

The operation in the case where a read command is received after a file identifier acquisition command to the existing file will now be described. The connection switching apparatus 5 confirms that the file operation command received from the client 1 is a read command and reads out a corresponding table, for example the table T1, from the table storage unit 38 on the basis of a table number in the command.

Then, in the connection switching apparatus 5, the signal processing/switching control unit 32 allocates and sends an adjusted read command to the file servers 3a, 3b in accordance with the contents of the table T1. The connection switching apparatus 5 rearranges response contents sent back from the file servers 3a, 3b into one group in accordance with the switching order and collectively sends back the response contents to client 1 from the telecommunication circuit 2.

Figures 4, 5:
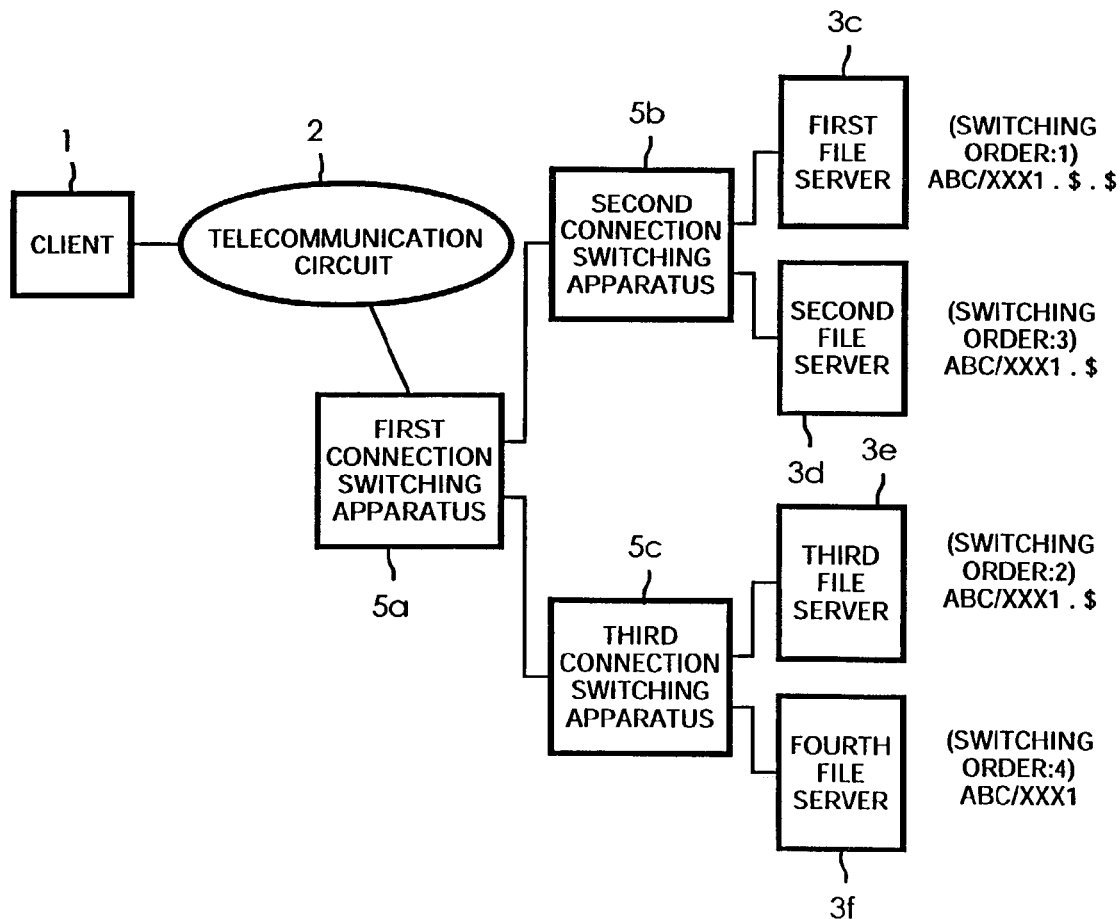
FIG. 4 is a view showing an example of a data reading order from respective file servers.
FIG. 5 is a block diagram showing a structure of a file system using connection switching apparatus of an alternative embodiment of the present invention.

FIG. 4 shows an example of the data reading order from the respective file servers 3a, 3b. In one embodiment, a split data unit is 4 kilobytes and the reading order of switching from the first file server 3a to the second file server 3b and then returning to the first file server 3a again is used, similar to the switching order discussed above in conjunction with FIG. 2.

In this reading order, first, the first 4-kilobyte data "ABC/XXX1.$: 1 to 4 k" of a file "XXX1" is read out from the first file server 3a, and then the next 4-kilobyte data "ABC/XXX1: 1 to 4 k" of the same file "XXX1" is read out from the second file server 3b. Then, the subsequent 4-kilobyte data "ABC/XXX1.$: (4 k+1) to 8 k" of the same file "XXX1" is read out from the first file server 3a, and the reading continues similarly. As described above, since the first file server 3a and the second file server 3b have provided their proper file identifiers (in this case, "ABC/XXX1.$" and "ABC/XXX1") to the same file "XXX1", the above-described reading order is used in consideration of their file identifiers. However, if only the file "XXX1" is considered, the first data "1 to 4 k" is read out from the first file server 3a and the second data "(4 k+1) to 8 k" is read out from the second file server 3b. The third data "(8 k−1) to 12 k" is read out from the first file server 3a and the fourth data "(12 k−1) to 16 k" is read out from the second file server 3b. The reading continues similarly.

Similarly, in the case of writing, first, the first 4-kilobyte data "1 to 4 k" of the file "XXX1" is stored to the first file server 3a as the first 4-kilobyte data "1 to 4 k" of the file having the file identifier "ABC/XXX1.$". The second 4-kilobyte data "(4 k+1) to 8 k" of the file "XXX1" is allocated to the second file server 3b and stored therein as the first 4-kilobyte data "1 to 4 k" of the file having the file identifier "ABC/XXX1". The third 4-kilobyte data "(8 k+1) to 12 k"

of the file "XXX1" is allocated again to the first file server 3a and stored therein as the second 4-kilobyte data "(4 k+1) to 8 k" of the file having the file identifier "ABC/XXX1.$". The writing continues similarly.

In this manner, in the first file server 3a, the data of the first to fourth kilobytes, the (8 k+1)th to twelfth kilobytes, and the (16 k+1)th to twentieth kilobytes of the file "XXX1" are stored as the data of the first to fourth kilobytes, the (4 k+1)th to eighth kilobytes, and the (8 k+1)th to twelfth kilobytes of the file having the file identifier "ABC/XXX1.$".

Similarly, in the second file server 3b, the data of the (4 k+1)th to eighth kilobytes, the (12 k+1)th to sixteenth kilobytes, and the (20 k+1)th to twenty-fourth kilobytes of the file "XXX1" are stored as the data of the first to fourth kilobytes, the (4 k+1)th to eighth kilobytes, and the (8 k+1)th to $12^{th}$ kilobytes of the file having the file identifier "ABC/XXX1".

When the last split data part received from each file server 3a, 3b has less than 4 kilobytes, data having a null value may be provisionally allocated to the vacant part.

As for the switching order stored in the file server switching order storage unit 35, as shown in the embodiment shown in FIG. 1, since the two file servers 3a, 3b are connected with the switching unit 34, the write command is allocated alternately. When three or more file servers are connected with the switching unit 34, the switching order stored in the file server switching order storage unit 35 is circular. In a further embodiment with three or more file servers, the switching may be a pseudo-random order that is replicable when the data is to be read out.

In the case of storing a file with a short file length into many file servers, it is preferred to select one file server 3a, 3b to be the leading end, for example, by using a random number, in order to avoid a noticeable increase in the frequency of use of only one of file servers 3a, 3b. As another method for avoiding a noticeable increase in the frequency of use of only one of file servers 3a, 3b when three or more file servers are used, for example, the signal processing/switching control unit 32 may store a file server in which writing is carried out in accordance with the last write command in the previous file writing, and when writing the next file to the file servers, writing in accordance with the first write command of this time may be carried out to a file server next to the file server in which writing is carried out in accordance with the last write command in the previous file writing. In this way, the consecutive write commands may be processed on different servers until all servers have been used as the initial server.

In this manner and in this embodiment, as the connection switching apparatus is arranged on the telecommunication circuit 2 side (client side) of the plurality of file servers 3a, 3b, only the connection switching apparatus needs special hardware and a high-speed, large-capacity and inexpensive file system can be constituted.

FIG. 5 is a block diagram showing a structure of a file system using a connection switching apparatus of another embodiment of the present invention. The block structure of the file system of FIG. 5 differs from that of the file system of FIG. 1 in that the number of file servers 3c, 3d, 3e, 3f to be connected is increased from two to four and that the connection switching apparatus 5a, 5b, 5c are hierarchically structured.

A first connection switching apparatus 5a is connected to a telecommunication circuit 2. A second connection switching apparatus 5b and a third connection switching apparatus 5c are connected to the first connection switching apparatus 5a. A first file server 3c and a second file server 3d are connected to the second connection switching apparatus 5b. A third file server 3e and a fourth file server 3f are connected to the third connection switching apparatus 5c.

FIGS. 6(a) to (c) show examples of the switching order that maybe stored in file server switching order storage units of the connection switching apparatus 5a, 5b, 5c of FIG. 5. In accordance with the switching order stored in the file server switching order storage unit 35 of the first connection switching apparatus 5a shown in FIG. 6(a), the second connection switching apparatus 5b is followed by the third connection switching apparatus 5c. In accordance with the switching order stored in the file server switching order storage unit 35 of the second connection switching apparatus 5b shown in FIG. 6(b), the first file server 3c is followed by the second file server 3d. Similarly, in accordance with the switching order stored in the file server switching order storage unit 35 of the third connection switching apparatus 5c shown in FIG. 6(c), the third file server 3e is followed by the fourth file server 3f.

FIG. 7 shows one embodiment of routes to the respective file servers 3c, 3d, 3e, 3r of FIG. 5. The first connection switching apparatus 5a regards the second connection switching apparatus 5b and the third connection switching apparatus 5c as pseudo file servers. Therefore, similar commands to those in the case of FIG. 1 can be used as commands from the first connection switching apparatus 5a to the second connection switching apparatus 5b and the third connection switching apparatus 5c.

On the other hand, since the second connection switching apparatus 5b and the third connection switching apparatus 5c regard the first connection switching apparatus go 5a as a pseudo client via the telecommunication circuit 2, similar responses to those of the case of FIG. 1 can be used as responses from the second connection switching apparatus 5b and the third connection switching apparatus 5c to the first connection switching apparatus 5a. Therefore, the number of hierarchical stages of the connection switching apparatus 5a, 5b, 5c can be easily increased or decreased.

FIG. 8(a) shows a table T2-1 stored in a table storage unit in the connection switching apparatus 5a of FIG. 5. FIG. 8(b) shows a table T2-2 stored in a table storage unit in the connection switching apparatus 5b of FIG. 5. FIG. 8(c) shows a table T2-3 stored in a table storage unit in the connection switching apparatus 5c of FIG. 5.

In the table T2-1 of the first connection switching apparatus 5a of FIG. 8(a), the file name and file identifier of a file read out from the second connection switching apparatus 5b, which is the first in the switching order, is "ABC/XXX1.$". An identifier ".$" is added to the data indicating the leading end at the first connection switching apparatus 5a when designating a file has been added to this file name. The file name and file identifier of a file read out from the third connection switching apparatus 5c, which is the second in the switching order, is "ABC/XXX1".

In the table T2-2 of the second connection switching apparatus 5b of FIG. 8(b), the file name and file identifier of a file read out from the first file server 3c, which is the first in the switching order, is "ABC/XXX1.$.$", and an identifier ".$" is added to the data indicating the leading end at the second connection switching apparatus 5b has been further added to the identifier ".$" that was added to data indicating the leading end at the first connection switching apparatus 5a. The file name and file identifier of a file read out from the second file server 3d, which is the second in the switching order, is "ABC/XXX1.$". An identifier ".$" is added to the data indicating the leading end at the second connection switching apparatus 5b when designating a file has been added to this file name.

In the table T2-3 of the third connection switching apparatus 5c of FIG. 8(c), the file name and file identifier of a file read out from the third file server 3e, which is the first in the switching order, is "ABC/XXX1.$". An identifier ".$" is added to the data indicating the leading end at the third connection switching apparatus 5c when designating a file has been added to this file name. The file name and file identifier of a file read out from the fourth file server 3f, which is the second in the switching order, is "ABC/XXX1" to which an identifier indicating the leading end has not been added. As a result, the same file name "ABC/XXX1.$" is used in the second connection switching apparatus 5b and the third connection switching apparatus 5c. However, no problem arises since the first connection switching apparatus 5a manages inputs from these connection switching apparatus 5b, 5c by using preset priority.

FIG. 9 shows an example of the data reading order from the respective file servers 3a, 3b, 3c, 3d depicted in FIG. 5. In this embodiment, a split data unit is 4 kilobytes, and the reading order of switching from the first file server 3c, to the third file server 3e, the second file server 3d, and the fourth file server 3f and then returning to the first file server 3a again is used, as shown in FIG. 9. This reading order results from switching between the first second connection switching apparatus 5b and the third connection switching apparatus 5c.

In this reading order, first, the first 4-kilobyte data "ABC/XXX1.$.$:1 to 4 k" of a file "XXX1" is read out from the first file server 3c, and then the second 4-kilobyte data "ABC/XXX1.$:1 to 4 k" of the file "XXX1" is read out from the third file server 3e. Next, the third 4-kilobyte data "ABC/XXX1.$:1 to 4 k" of the file "XXX1" is read out from the second file server 3d, and the fourth 4-kilobyte data "ABC/XXX1:1 to 4 k" of the file "XXX1" is read out from the fourth file server 3f. Then, the fifth 4-kilobyte data "ABC.XXX1.$.$:(4 k+1) to 8 k" of the file "XXX1" is read out again from the first file server 3c, and the reading continues similarly. As for the representation of the order of 4-kilobyte data, the description of the first embodiment, discussed in conjunction with FIG. 4, may be referred to. All file operation commands are made identical with respect to parts except for a file name and a data part of a file.

Of course, the writing order in the case of a write command is the same as the above-described reading order.

In this manner, in the first file server 3c, the data of the first to fourth kilobytes, the (16 k+1)th to twentieth kilobytes, the (32 k+1)th to thirty-sixth kilobytes, the (48 k+1)th to fifty-second kilobytes and the like of the file "XXX1" are stored as the data of the first to fourth kilobytes, the (4 k+1)th to eighth kilobytes, the (8 k+1)th to twelfth kilobytes, the (12 k+1)th to sixteenth kilobytes and the like of the file having the file identifier "ABC/XXX1.$.$" for the first file server 3c.

Similarly, in the third file server 3e, the data of the (4 k+1)th to eighth kilobytes, the (20 k+1)th to twenty-fourth kilobytes, the (36 k+1)th to fortieth kilobytes, the (52 k+1)th to fifty-sixth kilobytes and the like of the file "XXX1" are stored as the data of the first to fourth kilobytes, the (4 k+1)th to eighth kilobytes, the (8 k+1)th to twelfth kilobytes and the like of the file having the file identifier "ABC/XXX1.$" for the third file server 3e.

In the second file server 3d, the data of the (8 k+1)th to twelfth kilobytes, the (24 k+1)th to twenty-eighth kilobytes, the (40 k+1)th to forty-fourth kilobytes, the (56 k+1)th to sixtieth kilobytes and the like of the file "XXX1" are stored as the data of the first to fourth kilobytes, the (4 k+1)th to eighth kilobytes, the (8 k+1)th to twelfth kilobytes and the like of the file having the file identifier "ABC/XXX1.$" for the second file server 3d.

In the fourth file server 3f, the data of the (12 k+1)th to sixteenth kilobytes, the (28 k+1)th to thirty-second kilobytes, the (44 k+1)th to forty-eighth kilobytes, the (60 k+1)th to sixty-fourth kilobytes and the like of the file "XXX1" are stored as the data of the first to fourth kilobytes, the (4 k+1)th to eighth kilobytes, the (8 k+1)th to twelfth kilobytes and the like of the file having the file identifier "ABC/XXX1" for the fourth file server 3f.

When the last data unit received from each file server has less than 4 kilobytes, data having a null value may be provisionally allocated to the vacant part.

Although two hierarchical stages are used for the connection switching apparatus 5a, 5b, 5c in the depicted embodiment, one skilled in the art may employ three or more hierarchical stages by adding additional apparatus (not shown) similar to the connection switching apparatus 5a, 5b, 5c. Moreover, the number of branching directions of the respective connection switching apparatus 5a, 5b, 5c can be easily increased to three or more, instead of two.

In this manner, in this embodiment, as the plurality of connection switching apparatus 5a, 5b, 5c are arranged in the hierarchical structure on the telecommunication circuit 2 side (client side) of the plurality of file servers 3c, 3d, 3e, 3f, only the connection switching apparatus 5a, 5b, 5c need special hardware and a high-speed, large-capacity and inexpensive file system can be constituted. Moreover, the scale of the storage capacity can be easily extended simply by adding an additional file server and an additional connection switching apparatus.

Figure 10:
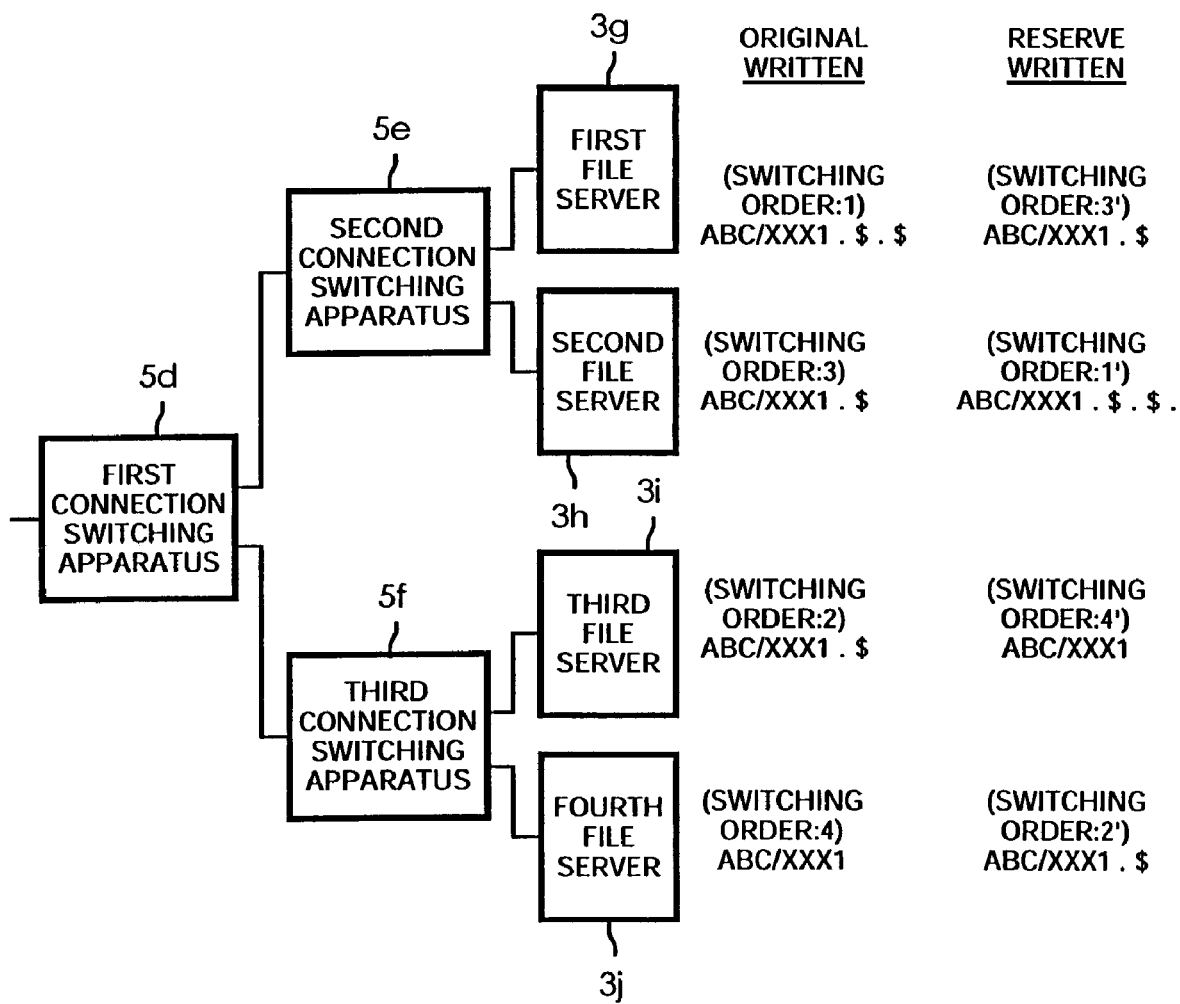
FIG. 10 is a block diagram showing a part of a structure of a file system using connection switching apparatus of a further embodiment of the present invention.

FIG. 10 is a block diagram showing a part of a structure of a file system using a connection switching apparatus of a further embodiment of the present invention. The block structure of the file system of FIG. 10 differs from that of the file system of FIG. 5 mainly in that a connection switching apparatus on the final stage of a hierarchy writes the same contents to plurality of file servers.

Specifically, a second connection switching apparatus 5e, when writing data with a file identifier "ABC/XXX1.$.$" to a first file server 3g, duplicates the data and also writes the data as data with a file identifier "ABC/XXX1.$.$" to a second file server 3h. Next, a third connection switching apparatus 5f, when writing data with a file identifier "ABC/XXX1.$" to a third file server 3i, duplicates the data and also writes the data as data with a file identifier "ABC/XXX1.$" to a fourth file server 3j.

Next, again the second connection switching apparatus 5e, when writing data with a file identifier "ABC/XXX1.$" to the second file server 3h, duplicates the data and also writes the data as data with a file identifier "ABC/XXX1.$" to the first file server 3g. Next, the third connection switching apparatus 5f, when writing data with file identifier "ABC/XXX1" to the fourth file server 3j, duplicates the data and also writes the data as data with a file identifier "ABC/XXX1" to the third file server 3i.

Figure 11:
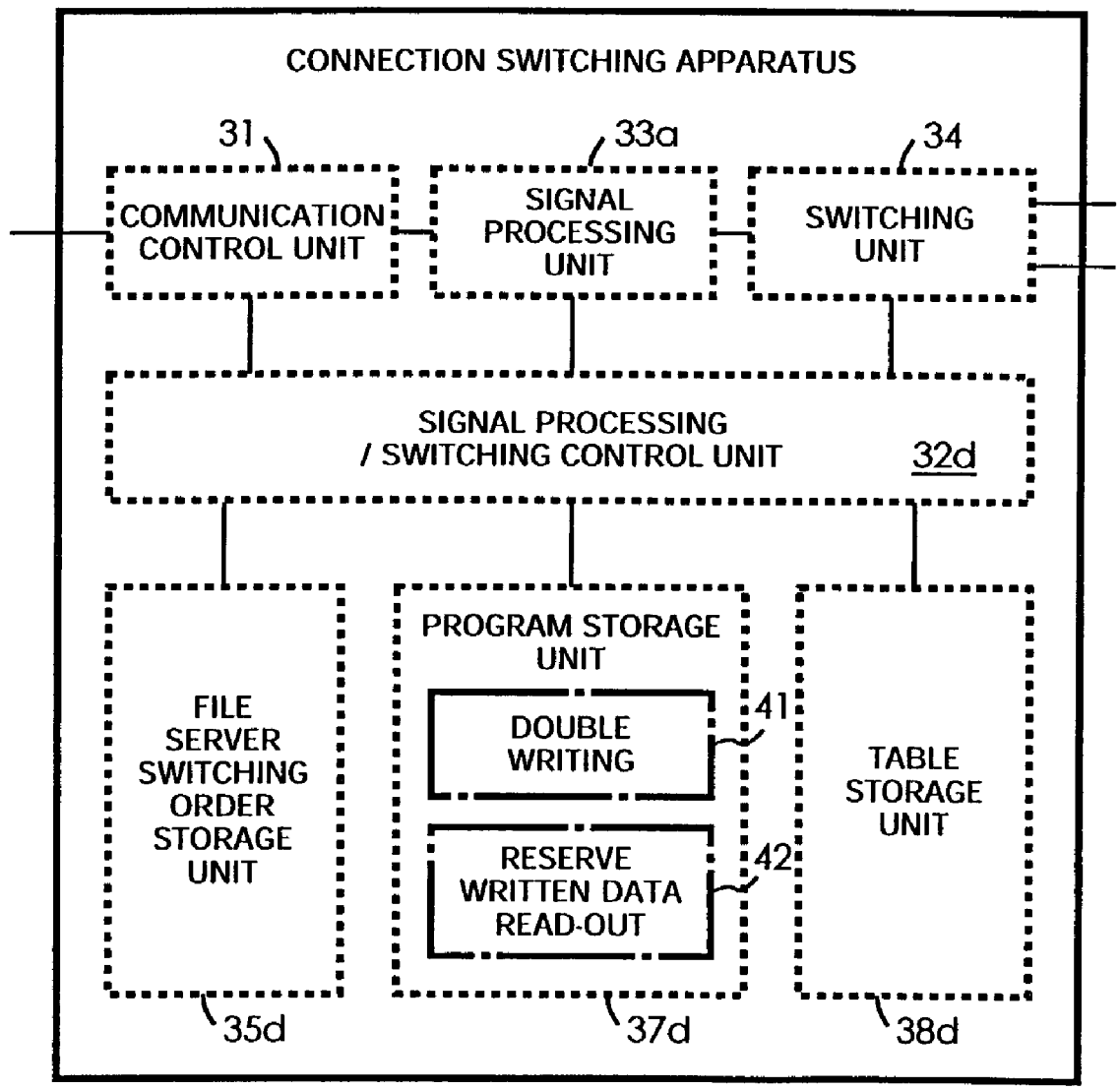
FIG. 11 is a block diagram showing one embodiment of an internal structure of a first connection switching apparatus, a second connection switching apparatus and a third connection switching apparatus.

FIG. 11 is a block diagram showing an internal structure of the first connection switching apparatus 5d, the second connection switching apparatus 5e, and the third connection switching apparatus 5f. The first connection switching apparatus 5d, the second connection switching apparatus 5e, and the third connection switching apparatus 5f differ from the previously described connection switching apparatus 5a, 5b, 5c of FIG. 5 mainly in that information of reserve file servers in which data is duplicated and written is stored in the first connection switching apparatus 5d in the switching order stored in a file server switching order storage unit 35d, as will be described later with reference to FIG. 12. Moreover, in the program storage units 37d of the connection switching apparatus 5e, 5f, which are lower in the hierarchical sequence than the first connection switching apparatus 5d, a program 41 for writing data to a regular file server, such as the first file server 3g, and also for copying the data and performing double reserve writing of the copied data to another file server, such as the second file server 3h. The program storage units 37d of the connection switching apparatus 5e, 5f also include a program 42 for reading out the reserve written data in the case where a certain accident or defect occurs in one of the file server, such as the first and second file servers 3g, 3h.

In short, in this embodiment of the hierarchically structured connection switching apparatuses 5d, 5e, 5f, the connection switching apparatuses 5e, 5f on the closest side to the file servers 3g, 3h, 3i, 3j may have a program for switching a switching unit 34 to duplicate a received communication packet at a signal processing unit 33 and perform reserve writing of the duplicate to at least one other file server connected to the switching unit 34, in addition to a program for switching the switching unit 34 for each communication packet received in accordance with the switching order when writing a file to the file servers 3g, 3h, 3i, 3j.

Moreover, the program storage units 37d of the connection switching apparatuses 5d, 5e, 5f may include a program for, in the case where there is a defective file server from which a file identifier cannot be read out when reading out the file identifier from the file servers 3g, 3h, 3i, 3j so as to prepare a table, reading a duplicate file from a file server in which the duplicate file corresponding to the file identifier written in the defective file is written.

In this embodiment, in order to minimize the communication load, the program 42 for switching the switching unit 34 to perform reserve writing is provided in the connection switching apparatuses 5e, 5f. However, the program 41 for switching the switching unit 34 to perform reserve writing may be provided in the program storage unit 37d of a connection switching apparatus on at least another hierarchical stage, such as the connection switching unit 5d of FIG. 11.

FIGS. 12(a) to (c) show examples of the switching order stored in the file server switching order storage units 35d of the respective connection switching apparatus 5d, 5e, 5f of FIG. 11. Since the switching apparatus 5d, 5e, 5f are hierarchically structured, in accordance with the switching order stored in the file server switching order storage unit 35d of the first connection switching apparatus 5d shown in FIG. 12(a), the second connection switching apparatus 5e is followed by the third connection switching apparatus 5f. In accordance with the switching order stored in the file server switching order storage unit 35d of the second connection switching apparatus 5e shown in FIG. 12(b), the first file server 3g is followed by the second file server 3h. Similarly, in accordance with the switching order stored in the file server switching order storage unit 35d of the third connection switching apparatus 5f shown in FIG. 12(c), the third file server 3i is followed by the fourth file server 3j.

In this embodiment, however, for restoration in the case where a defect occurs, a reserve switching order as shown in FIG. 12(b) is stored in the file server switching order storage unit 35d, for example, to write reserve data also to the second file server 3h when writing data to the first file server 3g or to write reserve data also to the first file server 3g when writing data to the second file server 3h. Similarly, a reserve switching order as shown in FIG. 12(c) is stored in the file server switching order storage unit 35d to write reserve data also to the fourth file server 3j when writing data to the third file server 3i or to write reserve data also to the third file server 3i when writing data to the fourth file server 3j.

Figure 13:
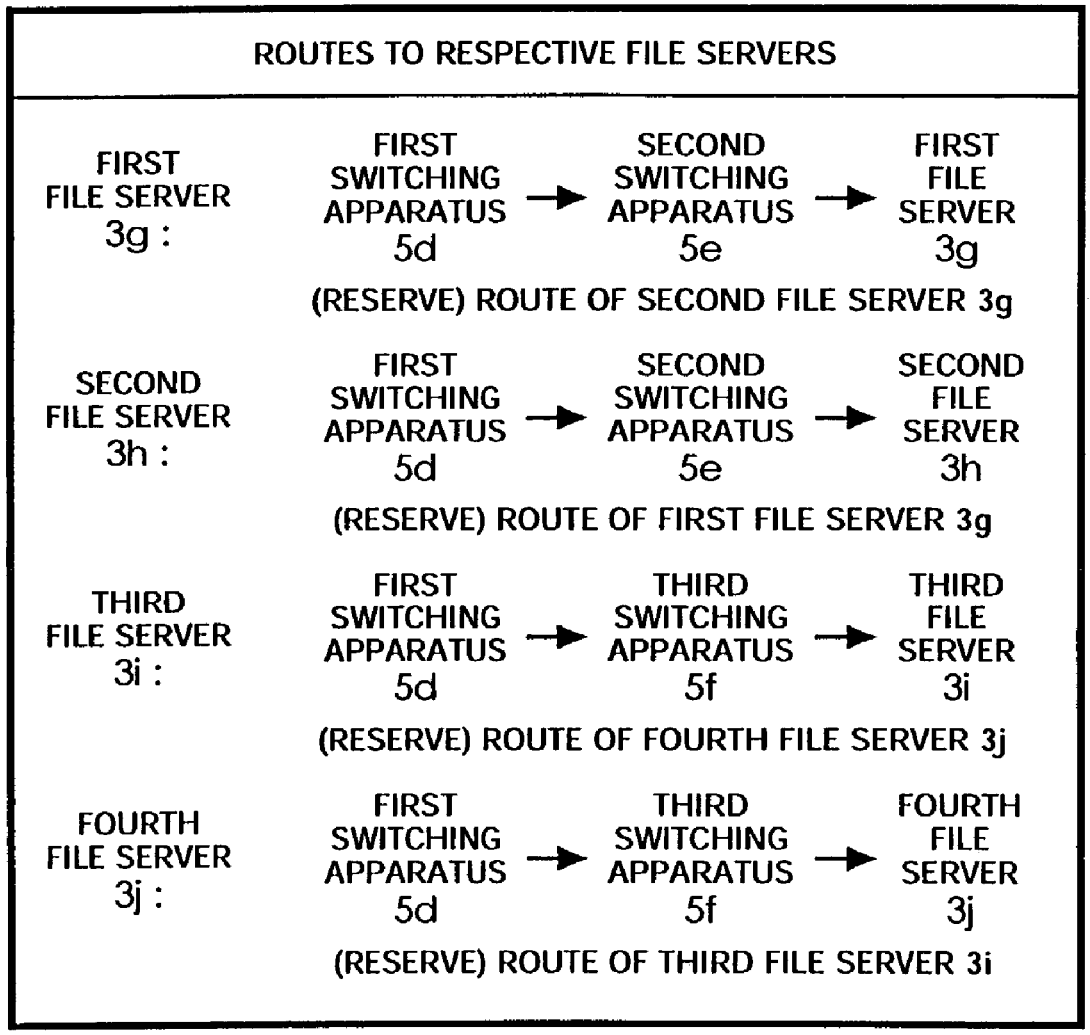
FIG. 13 shows examples of routes to respective file servers of FIG. 10.

FIG. 13 shows exemplary routes to reach the respective file servers of FIG. 10. Again, for ordinary operation, a route from the first connection switching apparatus 5d to the first file server 3g is via the second switching apparatus 5e, as in one embodiment. Similarly, a route from the first connection switching apparatus 5d to the second file server 3h is via the second connection switching apparatus 5e. A route from the first connection switching apparatus 5d to the third file server 3i is via the third connection switching apparatus 5f, and a route from the first connection switching apparatus 5d to the fourth file server 3j is via the third connection switching apparatus 5f.

FIGS. 14(a) to (c) show tables T3-1, T3-2, T3-3 that in one embodiment are stored in the table storage unit 38d of FIG. 11. FIG. 14(a) shows a table T3-1 that may be stored in the table storage unit of the connection switching apparatus 5d of FIG. 10. FIG. 14(b) shows a table T3-2 that may be stored in the table storage unit of the connection switching apparatus 5e of FIG. 10. FIG. 14(c) shows a table T3-3 that may be stored in the table storage unit of the connection switching apparatus 5f of FIG. 10.

In the table T3-1 of the first connection switching apparatus 5d, the file identifier of a file read out from the second connection switching apparatus 5e, which is the first in the ordinary switching order, is "ABC/XXX1.$". The code ".$" has been added to indicate the leading end at the first connection switching apparatus 5d when designating a file identifier. Also the file identifier of a file read out from the third connection switching apparatus 5f, which is the first in the reserve switching order, is "ABC/XXX1.$".

The file identifier of a file read out from the third connection switching apparatus 5f, which is the second in the ordinary switching order, is "ABC/XXX1." Also, the file identifier of a file read out from the second connection switching apparatus 5e, which is the second in the reserve switching order, is "ABC/XXX1".

In the table T3-2 of the second connection switching apparatus 5e of FIG. 14(b), the file identifier of a file read out from the first file server 3g, which is the first in the ordinary switching order, is "ABC/XXX1.$.$". The code ".$" has been added to indicate the leading end at the second connection switching apparatus 5e, in addition to the code ".$" added for indicating the leading end at the first connection switching apparatus 5d when designating a file identifier. Also the file identifier of a file read out from the second file server 3h, which is the first in the reserve switching order, is "ABC/XXX1.$.$".

The file identifier of a file read out from the second file server 3h, which is the second in the ordinary switching order, is "ABC/XXX1.$". The code ".$" has been added to indicate the leading end at the second connection switching apparatus 5e when designating a file identifier. Also, the file identifier of a file read out from the first file server 3g, which is the second in the reserve switching order, is "ABC/XXX1.$".

In the table T3-3 of the third connection switching apparatus of FIG. 14(c), the file identifier of a file read out from the third file server 3i, which is the first in the ordinary switching order, is "ABC/XXX1.$". The code ".$" has been added to indicate the leading end at the third connection switching apparatus 5f when designating a file identifier.

Also, the file identifier of a file read out from the fourth file server 3j, which is the first in the reserve switching, is "ABC/XXX1.$".

The file identifier of a file read out from the fourth file server 3j, which is the second in the ordinary switching order, is "ABC/XXX1". No code indicating the leading end has been added to this file identifier. Also the file identifier of a file read out from the third file server 3i, which is the second in the reserve switching order, is "ABC/XXX1". As a result, the second connection switching apparatus 5e and the third connection switching apparatus 5f handle the same file identifier "ABC/XXX1.$". However, no problem arises since the first connection switching apparatus 5d manages inputs from these connection switching apparatus 5e, 5f by using preset priority.

Figure 15:
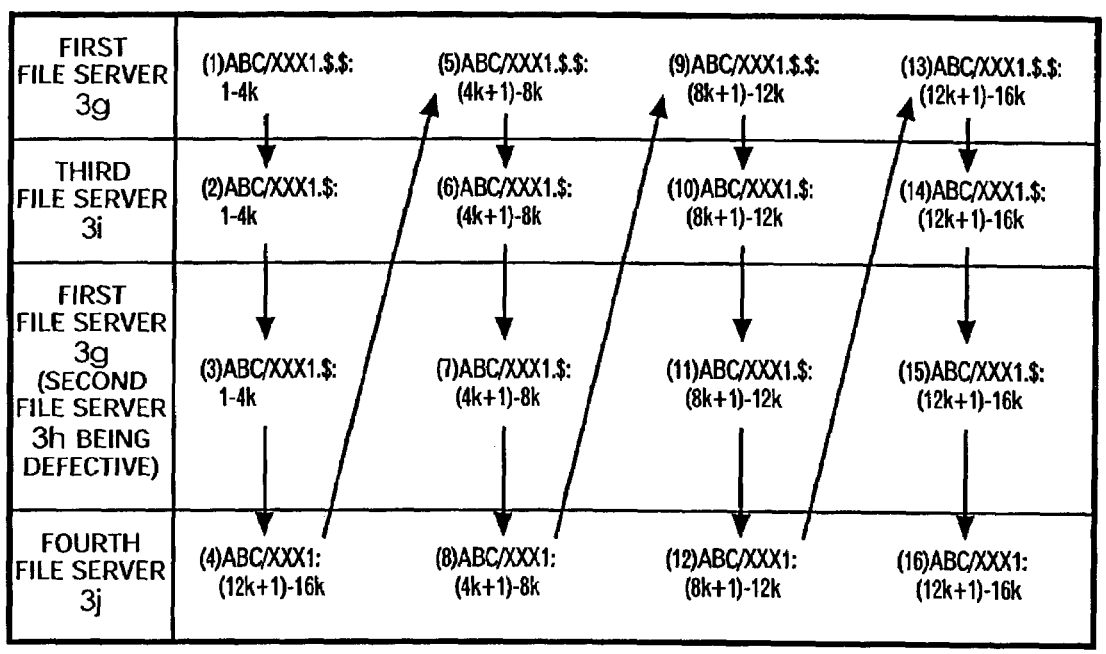
FIG. 15 is a view showing one embodiment of a reading order when a defect occurs in the second file server.

FIG. 15 shows the reading order in the case of reading a file using reserve data written in the first file server 3g when a defect occurs in the second file server 3h and its data cannot be read out.

First, the first 4-kilobyte data of the first file having a file identifier "ABC/XXX1.$.$" is read out from the first file server 3g, which is the first in the switching order. Next, the second 4-kilobyte data of a file having a file identifier "ABC/XXX1.$" is read out from the third file server 3i, which is the second in the switching order.

Next, the third 4-kilobyte data of the file having the file identifier "ABC/XXX1.$" is supposed to be read out from the second file server 3h, which is the third in the switching order. However, in the given embodiment, since a defect occurs in the second file server 3h and its file cannot be read out, a corresponding reserve file is read out from the first file server 3g, and a file having a file identifier "ABC/XXX1" is read out from the fourth file server 3j, which is the fourth in the switching order. Similarly, data is circularly read out after that in accordance with the above-described switching order. As for the file in the second file server 3h, the reserve file is read out from the first file server. When no defect occurs, the reading order similar to that of the embodiment previously described may be used.

In this embodiment, writing and reading of a reserve file is carried out at the connection switching apparatus situated on the hierarchical stage, such as the second or third connection switching apparatus 5e, 5f, that is closest to file server, such as the file servers 3g, 3h, 3i, 3j, in order to minimize the quantity of communication necessary for writing of the reserve file. However, writing and reading of the reserve file may also be carried out at the connection switching apparatus situated on another hierarchical stage, such as the first connection switching apparatus 5d of FIG. 10.

Moreover, while two hierarchical stages are used for the connection switching apparatuses in the described embodiment, three or more hierarchical stages may be employed by adding apparatus similar to the second and third connection switching apparatuses 5b and 5c. Furthermore, the number of branching directions of the respective connection switching apparatus 5d, 5e, 5f may be easily increased to three or more, instead of two.

Thus, in the depicted embodiment, the connection switching apparatus 5e, 5f arranged on the file server 3g, 3h, 3i, 3j side may prepare a duplicate when writing data and store the original data and reserve duplicate data to different file servers, thus enabling automatic reading of the reserve data in the case where a defect occurs in one file server. Therefore, only the connection switching apparatus 5e, 5f need special hardware and a high-speed, large-capacity and inexpensive file system can be constituted. The scale of the storage capacity can be easily extended simply by adding an additional file server and an additional connection switching apparatus. Moreover, data can be easily restored when a defect occurs.

As described above, according to the present invention, as the connection switching apparatus is arranged on the telecommunication circuit 2 side (client side) of the plurality of file servers 3g, 3h, 3i, 3j, only the connection switching apparatus 5d, 5e, 5f need special hardware and a high-speed, large-capacity and inexpensive file system can be constituted.

Moreover, according to the present invention, as the plurality of connection switching apparatus 5d, 5e, 5f are arranged in the hierarchical structure on the telecommunication circuit 2 side of the plurality of file servers 3g, 3h, 3i, 3j, the scale of the storage capacity can be easily extended simply by adding an additional file server and an additional connection switching apparatus.

Furthermore, according to the present invention, as the connection switching apparatus 5d, 5e, 5f arranged on the file server side prepare a duplicate when writing data and store the original data and reserve duplicate data to different file servers, thus enabling automatic reading of the reserve data in the case where a defect occurs in one file server, data can be easily restored when a defect occurs.

What is claimed is:

1. An connection switching apparatus for writing a file to and reading a file from a plurality of file servers, the connection switching apparatus comprising:
   a signal processing module configured to process a file operation command that is associated with the file and to duplicate the file operation command according to the quantity of the plurality of file servers;
   a switching module configured to send, according to a switching order, the file operation command to one of the plurality of file servers and to send a communication packet to the client; and
   a program storage module configured to store a program for processing the file operation command.

2. The connection switching apparatus of claim 1, wherein the signal processing module is further configured to rewrite a part of the file operation command to utilize the plurality of file servers.

3. The connection switching apparatus of claim 1, further comprising a communication control module configured to communicate with a client computer via the communication packet over a communication channel.

4. The connection switching apparatus of claim 1, further comprising a switching order storage module configured to set and store the switching order.

5. The connection switching apparatus of claim 4, further comprising a signal processing/switching control module configured to communicate processing and switching control signals and data among the signal processing module, the switching module, the switching order storage module, and the program storage module.

6. The connection switching apparatus of claim 1, wherein the switching order comprises an alternating switching order.

7. The connection switching apparatus of claim 1, wherein the switching order comprises a circular switching order.

8. The connection switching apparatus of claim 1, wherein the program storage module further comprises a duplication writing module configured to write the file to a first file server and to write a duplicate copy of the file to a second file server.

9. The connection switching apparatus of claim 1, wherein the program storage module further comprises a recovery module configured to read a duplicate copy of the file from a second file server when the file cannot be read from a first file server.

10. The connection switching apparatus of claim 1, further comprising a table storage module configured to store a mapping table that includes a file identifier that corresponds to the file and a file server address that indicates the location of the file on a first file server of the plurality of file servers.

11. The connection switching apparatus of claim 10, wherein the table storage module is further configured to store a reserve file identifier that corresponds to a duplicate file and a reserve file server address that indicates the location of the duplicate file on a second file server of the plurality of file servers.

12. The connection switching apparatus of claim 10, wherein the file operation command is a new file preparation command and the program storage module further comprises a new file preparation module that is configured to store a table that includes the file identifier and the file server address, set a table number, and communicate the table number to the client.

13. The connection switching apparatus of claim 12, wherein the file operation command is a file write command and the program storage module further comprises a file write module that is configured to read the table from the table storage module and send a duplicated write command to each of the plurality of file servers according to the table.

14. The connection switching apparatus of claim 10, wherein the file operation command is an existing file acquisition command and the program storage module further comprises an existing file acquisition module that is configured to query the plurality of file servers for the file identifier, store a table that includes the file identifier and the file server address, set a table number, and communicate the table number to the client.

15. The connection switching apparatus of claim 14, wherein the file operation command is a file read command and the program storage module further comprises a file read module that is configured to read the table from the table storage module and send a duplicated read command to each of the plurality of file servers according to the table.

16. The connection switching apparatus of claim 1, wherein the signal processing module is further configured to append an indicating code to the name of the file in one of the plurality of file servers that is designated as a leading file server.

17. The connection switching apparatus of claim 1, wherein the signal processing module is further configured to randomly select one file server from the plurality of file servers to be the leading file server.

18. The connection switching apparatus of claim 1, wherein the signal processing module is further configured to sequentially select one file server from the plurality of file servers to be the leading file server.

19. A system for writing a file to and reading a file from a plurality of file servers using a connection switching apparatus, the system comprising:
a client;
a plurality of file servers configured to store and access a file in response to a file operation command from the client; and
a connection switching apparatus in communication with the client and the plurality of file servers and configured to duplicate the file operation command from the client and send the duplicated file operation command to one of the plurality of file servers.

20. A system for writing a file to and reading a file from a plurality of file servers using a plurality of hierarchically structured connection switching apparatus, the system comprising:
a client;
a plurality of file servers configured to store and access a file in response to a file operation command from the client;
a first connection switching apparatus in communication with the client and configured to duplicate the file operation command from the client and send the duplicated file operation command to a second connection switching apparatus; and
the second connection switching apparatus configured to duplicate the file operation command from the first connection switching apparatus and send the duplicated file operation command to one of the plurality of file servers.

21. The system of claim 20, wherein the first connection switching apparatus is configured to append a first indicating code to the name of the file in one of the plurality of file servers that is designated as a leading file server.

22. The system of claim 21, wherein the second connection switching apparatus is configured to append a second indicating code to the name of the file in one of the plurality of file servers that is designated as a leading file server.

23. A process for writing a file to and reading a file from a plurality of file servers using a connection switching apparatus, the process comprising:
processing a file operation command that is associated with the file;
duplicating the file operation command according to the quantity of the plurality of file servers;
sending, according to a switching order, the file operation command to one of the plurality of file servers; and
storing a program for processing the file operation command.

24. The process of claim 23, further comprising writing the file to a first file server and writing a duplicate copy of the file to a second file server.

25. The process of claim 23, further comprising reading a duplicate copy of the file from a second file server when the file cannot be read from a first file server.

26. The process of claim 23, further comprising storing a mapping table that includes a file identifier that corresponds to the file and a file server address that indicates the location of the file on a first file server of the plurality of file servers.

27. The process of claim 26, further comprising storing a reserve file identifier that corresponds to a duplicate file and a reserve file server address that indicates the location of the duplicate file on a second file server of the plurality of file servers.

28. A process for writing a file to and reading a file from a plurality of file servers using a connection switching apparatus, the process comprising:
communicating with a client computer via the communication packet over a communication channel;
processing a file operation command that is associated with the file;
duplicating the file operation command according to the quantity of the plurality of file servers;
setting and storing a switching order;

sending, according to the switching order, the file operation command to one of the plurality of file servers;

appending an indicating code to the name of the file in one of the plurality of file servers that is designated as a leading file server;

storing a mapping table that includes a file identifier that corresponds to the file and a file server address that indicates the location of the file on one of the plurality of file servers; and storing a program for processing the file operation command.

29. A computer readable storage medium comprising computer readable code configured to carry out a process for writing a file to and reading a file from a plurality of file servers using a connection switching apparatus, the process comprising:

processing a file operation command that is associated with the file;

duplicating the file operation command according to the quantity of the plurality of file servers;

sending, according to a switching order, the file operation command to one of the plurality of file servers; and storing a program for processing the file operation command.

30. An apparatus for writing a file to and reading a file from a plurality of file servers using a connection switching apparatus, the apparatus comprising:

means for communicating with a client computer via the communication packet over a communication channel;

means for processing a file operation command that is associated with the file;

means for duplicating the file operation command according to the quantity of the plurality of file servers;

means for setting and storing a switching order;

means for sending, according to the switching order, the file operation command to one of the plurality of file servers;

means for appending an indicating code to the name of the file in one of the plurality of file servers that is designated as a leading file server;

means for storing a mapping table that includes a file identifier that corresponds to the file and a file server address that indicates the location of the file on one of the plurality of file servers; and means for storing a file operation command processing program.

* * * * *